United States Patent
Elliott

[15] 3,671,025
[45] June 20, 1972

[54] FLUID MIXING DEVICE

[72] Inventor: Perry R. Elliott, Route 1, Box 950, Eugene, Oreg. 97402

[22] Filed: May 3, 1971

[21] Appl. No.: 139,931

Related U.S. Application Data

[63] Continuation of Ser. No. 746,438, July 22, 1968, abandoned.

[52] U.S. Cl. ...........................261/76, 261/78 A, 261/116, 239/434.5
[51] Int. Cl. ...........................B01f 5/04
[58] Field of Search .........239/434.5; 261/76, 78 A, DIG. 54, 261/116

[56] References Cited

UNITED STATES PATENTS

| | | | |
|---|---|---|---|
| 61,632 | 1/1867 | Moody | 261/76 |
| 732,206 | 3/1903 | Luckenbach | 261/78 A |
| 1,513,599 | 10/1924 | Kay | 261/76 |
| 2,093,011 | 9/1937 | Grosz | 261/76 |
| 2,447,123 | 8/1948 | Jones | 261/DIG. 54 |
| 3,143,401 | 8/1964 | Lambrecht | 261/76 |

Primary Examiner—Tim R. Miles
Assistant Examiner—Steven H. Markowitz
Attorney—Buckhorn, Blore, Klarquist & Sparkman

[57] ABSTRACT

A fluid mixing device suitable for oil burner use comprises an outer cylindrical tubular member and an inner cylindrical tubular member provided with a flared bell at one end thereof. The outer peripheral lip of the bell has a diameter thereacross which is at least half the inner diameter of the outer tubular member, for defining a narrow annular venturi orifice of substantially constant radial dimension. Air flowing in the outer tubular member increases in velocity and decreases in pressure at the orifice for drawing oil from the inner tubular member in order to produce a finely mixed fog beyond the flared bell.

11 Claims, 3 Drawing Figures

PATENTED JUN 20 1972 3,671,025
FIG. 1
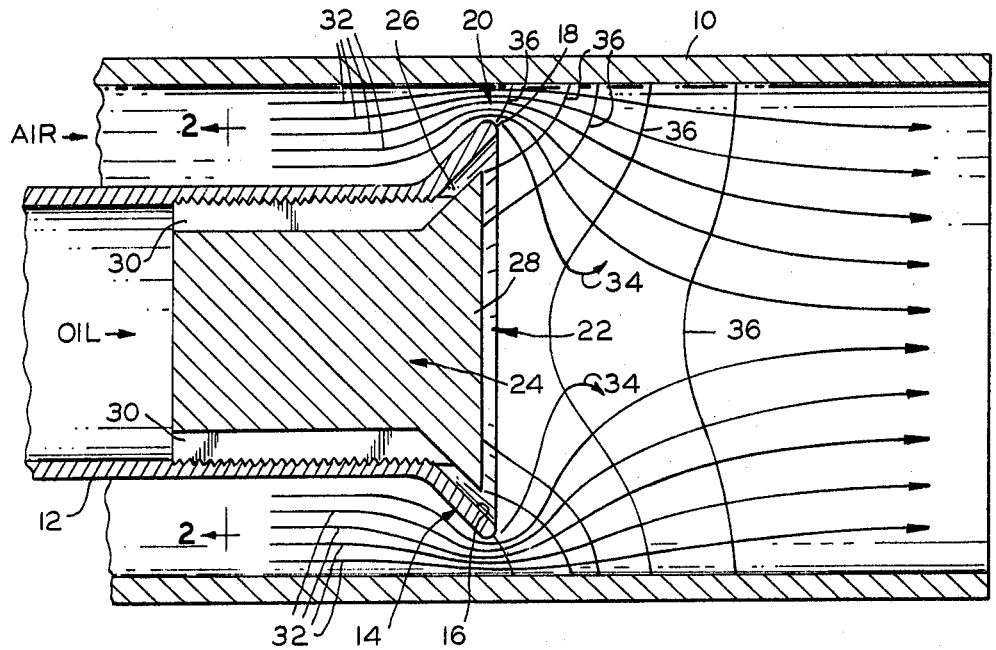
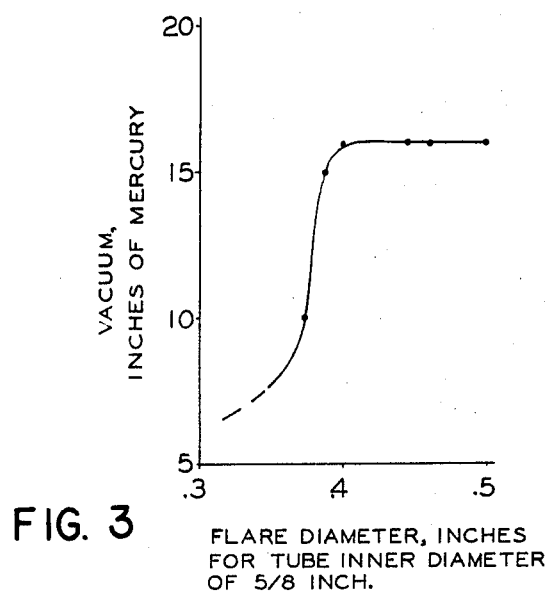
FIG. 3  FLARE DIAMETER, INCHES FOR TUBE INNER DIAMETER OF 5/8 INCH.
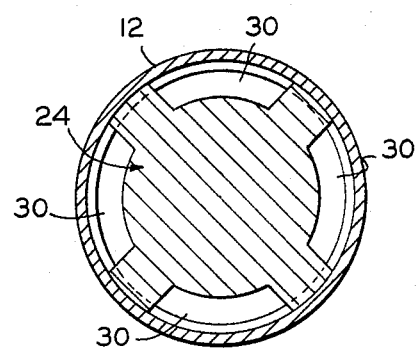
FIG. 2
PERRY R. ELLIOTT
INVENTOR
BY
BUCKHORN, BLORE, KLARQUIST & SPARKMAN
ATTORNEYS

FLUID MIXING DEVICE

This application is a continuation of Ser. No. 746,438 filed July 22, 1968, and now abandoned.

BACKGROUND OF THE INVENTION

A number of devices are available for mixing oil with air prior to combustion of the mixture in an oil burning furnace. For example, an oil nozzle may be located in an air passage where an air blast through such passage produces suction for withdrawing oil from the nozzle and mixing the oil with the air in atomizer fashion. The air passage may be constructed to form a venturi at the location of the oil nozzle for increasing the velocity of the air and producing a decrease in pressure for withdrawing oil from the nozzle. However, the usual arrangement is frequently limited in capacity, and is also limited in the viscosity of oil which may be employed to produce an adequate mixture. Heavy oils will usually not produce a stable fog or adequate burning. Therefore, waste and pollution of the atmosphere by unburned hydrocarbons is likely to occur.

SUMMARY OF THE INVENTION

According to the present invention, a mixing device comprises a first tubular member through which a gas stream flows, and a conduit member which flares outwardly from a central location within the first tubular member. The diameter or cross sectional dimension of the periphery of the flared conduit member or the inside diameter of the flared conduit member at its flared exit is at least half the diameter of the cross sectional inside dimension of the first tubular member at the orifice. The flared conduit member produces a constriction in the flow of gas in the first tubular member with the periphery of the flared conduit member defining a narrow annular venturi orifice substantially all the way around the inside diameter of the first tubular member through which the stream of gas is directed. A flowable material, for example a liquid such as oil, in the flared conduit member is withdrawn from the flared conduit due to the higher velocity and lower pressure of gas at the narrow annular venturi orifice. A considerable region of violent turbulence is produced immediately downstream of the flared conduit member. As a consequence, extremely fine mixing occurs with ordinary fluids, and heavier oils or the like will also produce a stable fog for combustion purposes.

It is accordingly an object of the present invention to provide an improved fluid mixing device producing an enhanced mixing action and a more stable fog of liquid.

It is another object of the present invention to provide an improved fluid mixing device for producing a stable fog with relatively heavy oils.

It is another object of the present invention to provide an improved oil and air mixing device to supply a combustion mixture with which more complete combustion may be attained.

It is a further object of the present invention to provide an improved mixing device having increased capacity wherein a larger volume of mixture may be produced.

It is a further object of the present invention to provide an improved mixing device where enhanced mixing is secured through enhanced turbulence.

It is a further object of the present invention to provide an improved mixing device for producing an enhanced vacuum.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a cross section of a mixing device according to the present invention, taken longitudinally therethrough;

FIG. 2 is a transverse cross section of the mixing device according to the present invention taken at 2—2 in FIG. 1; and FIG. 3 is a curve plotting vacuum pull in the mixing device according to the present invention against various outside diameters of the flared bell employed in the present invention.

DETAILED DESCRIPTION

Referring to FIGS. 1 and 2, the fluid mixing device according to the present invention includes a first tubular member 10 which is preferably cylindrical and of substantially uniform diameter therealong. The tubular member 10 is provided with a supply of gas, e.g. air, flowing from left to right, as illustrated in FIG. 1, and which may be obtained from an air pump, fan, or the like. Coaxially located within the first tubular member is a second tubular member 12 which is supported within tubular member 10 (by means not shown), tubular member 12 also desirably having a substantially uniform diameter along the major portion thereof. However, the tubular member 12 is provided at its output end with a flared conduit or bell 14 sloping outwardly from the central location of tubular member 12 toward the inner wall of tubular member 10. The conduit or bell 14 desirably slopes or flares outwardly at a constant angle relative to the axis of the tubes 10 and 12 and desirably has a wall thickness which is the same as the wall thickness of tube 12, with bell 14 ordinarily comprising an extension of tube 12. Thus, the inner wall 16 also slopes or tapers outwardly at a constant angle relative to the axis of the device. The angle of flare of bell 14 is not particularly critical. For example, the angle between the bell wall and the center line of tube 12 may be as little as 6° or the angle may be substantially 180°, placing the bell wall substantially at right angles to the air flow stream. The inner surface 16 of the bell can vary within the same limits, but does not necessarily have to follow the same contour as the outer wall. An angle in the region of approximately 30° to 60° is preferred.

The flared conduit or bell 14 terminates in a circular lip 18 spaced a substantially uniform radial distance or width away from the inner wall of conduit 10, defining a narrow annular venturi orifice 20 between lip 18 and the inside of tubular member 10. As will hereinafter be further indicated, the diameter or cross sectional dimension of the periphery of circular lip 18 is at least half the diameter or cross sectional inner dimension of tubular member 10, whereby a substantial constriction in the flow of air (or other gas) in tube 10 is provided. The diameter of the periphery of lip 18 is preferably at least 60 to 65 percent of the inside diameter of tube 10. Also, the diameter of inner tubular member 12, before the bell, is preferably not more than 80 percent of the diameter of the periphery of lip 18.

The bell 14 opens downstream with reference to the flow of air or other gas, defining a throat opening generally indicated at 22. This throat opening may be substantially closed centrally of the bell by a plug 24 illustrated. However, the throat opening remains open adjacent the annular venturi orifice 20, inasmuch as the plug 24 is spaced from inner surface 16 of bell 14 to provide an annular tapered passage 26. For this purpose, the head 28 of plug 24 is desirably tapered outwardly at approximately the same angle as inner surface 16 of bell 14.

Plug 24 is threaded at its outer diameter, except for head 28, to threadably engage an inside thread provided on the inner wall of tube 12. However, the thread on plug 24 is interrupted by a plurality of longitudinal slots 30 communicating between tapered annular passage 26 and the inside of tube 12. It should also be noted that the front surface of head 28 is recessed back of the plane of lip 18, and in general the first tubular member 10 is free of obstruction downstream of flared conduit member or bell 14 for at least approximately a distance equal to the diameter of lip 18. An obstruction in the area downstream or in front of the throat of bell 14 deleteriously affects the vacuum, and the desired turbulence produced in this region.

It should further be noted that use of plug 24 is preferred, but not necessary. Enhanced operation of the invention is produced employing plug 24, since plug 24 separates the interior of tube 12 from a higher pressure region coaxial with plug 24 in front of or downstream from bell 14.

In general, according to the operation of the device according to the present invention, oil is provided from the left within tube 12 and may be, but need not be, under pressure, except in the case of higher viscosity fluids where pressure may be required. Flow lines 32 indicate the flow of air under pressure past the bell 14, where the flow is constricted in the annular venturi orifice 20. In this region, the velocity of the air increases and a partial vacuum is provided at the location of lip 18 of bell 14. The oil in tube 12 forms a thin film over the inner or downstream walls of bell 14, e.g. on inner surface 16, traveling towards the extremity of lip 18, where the vacuum draws it into the rushing stream of air. The rushing air produces a vacuum within the bell, through passage 26, bringing oil in a very thin film along inner surface 16 to the downstream extremity of the lip 18 where it is picked up and carried by the air for producing a fine cone-shaped fog blowing downstream, where a firebox or the like may be located. The mixture is produced over an extended area all around the peripheral location of lip 18, and mixture is greatly facilitated by the violent turbulence at the edge of lip 18 and in front of or immediately downstream from bell 14 as indicated by flow lines 34.

Lines 36 are lines of equal pressure with the least pressure being observed across annular orifice 20. As can be seen, lines of higher pressure tend to bow inwardly from the center of tubular member 10, downstream of bell 14, back into the throat of bell 14. Plug 24 blocks high pressure from being exerted back into the interior of tube 12 and facilitates the vacuum produced by the device according to the present invention within tube 12. It should be noted that both the flow lines and the lines of equal pressure are approximate only, to aid in the explanation of the present device. Actually in the region in front of or just downstream from bell 14, a great turbulence takes place rather than the streamlined flow which would be indicated by the flow lines shown in FIG. 1.

Table I lists dimensions for a number of fluid mixing devices constructed in accordance with the present invention and results achieved therewith in terms of the vacuum pull produced within tube 12 by the flow of air at the listed pressures. In each case, the outer tubular member 10 has an inside diameter of five-eighths inch. No plug 24 was employed. In Table II, similar data is given for the device this time employing a plug 24. Again, the inside diameter of the outer tube was in each case five-eighths inch.

TABLE I

| Inner tube 12, size O.D. inches | Pressure in outer Tube 10, P.S.I. | Vacuum pull in inches of mercury in inner tube 12 | Bell 14 flare size across lip 18 in inches |
| --- | --- | --- | --- |
| ¼ | 10 | 0 | no flare |
| ¼ | 20 | 2.5 | no flare |
| ¼ | 20 | 10 | .377 |
| ¼ | 20 | 16 | .400 |
| ¼ | 20 | 16 | .460 |
| ¼ | 25 | 17.5 | .460 |
| ¼ | 30 | 12 | .460 |
| 5/16 | 10 | 7 | .391 |
| 5/16 | 20 | 15 | .391 |
| 5/16 | 20 | 16 | .445 |
| 5/16 | 20 | 16 | .500 |
| 5/16 | 30 | 17.5 | .500 |
| 5/16 | 40 | 12 | .500 |

TABLE II

| | | | |
| --- | --- | --- | --- |
| 5/16 | 10 | 8–9 | .500 |
| 5/16 | 20 | 16 | .500 |
| 5/16 | 30 | 20 | .500 |
| 5/16 | 40 | 20 | .500 |

The air pressure in p.s.i. was measured with a pressure gauge communicating with the interior of tubular member 10 well upstream above the location of bell 14. The vacuum pull in inches of mercury was measured with a manometer communicating with the interior of tube 12 upstream from plug 24. This vacuum pull in inches of mercury represents the difference between the pressure within tube 12 and standard atmospheric pressure.

It will be noted that an appreciable vacuum does not occur unless the diameter of the bell across lip 18 is greater than half the inside diameter of the outer tube (here 0.625 in.). Data is plotted in FIG. 3 for the tests where the air pressure in the outer tube upstream from bell 14 was maintained at 20 p.s.i. It can be seen, for an outer tube diameter of five-eighths inch, the flare diameter across lip 18 should be 0.38 inch or more in order to provide effective venturi action for producing an effective vacuum inside tube 12. Below approximately 0.38 inch, the vacuum drops off appreciably and it can be seen from Table I that when the flare is eliminated, no vacuum is produced within tube 12 with an air pressure of 10 p.s.i., while the vacuum pull of only 2.5 inches of mercury is produced when the pressure in tube 10 is increased to 20 p.s.i. As can also be seen from the FIG. 3 curve, it is preferable for the flared diameter across lip 18 to be greater than 0.39 inch, or greater than approximately 60 to 65 percent of the inside diameter of tube 10. For a flare diameter above 0.4 inch, the vacuum produced tends to level out at approximately 16 inches of mercury. Of course, it is possible to increase the vacuum by increasing the air pressure in tube 10 somewhat. For example, by increasing the pressure in tube 10 to 30 p.s.i., the vacuum pull of 17.5 inches of mercury results.

Moreover, improved results can be obtained with the use of plug 24 as can be seen from the data of Table II. With a flared diameter across lip 18 of 0.5 inch and the pressure of tube 10 of 20 p.s.i., the vacuum pull in tube 12 is still 16 inches of mercury. However, by increasing the air pressure in tube 10 to 30 p.s.i. or more, a vacuum pull of 20 inches of mercury can be produced inside tube 12. Thus, while plug 24 is not necessary to the operation of the present invention, it is nevertheless preferred, especially when high vacuums are desired and higher air pressure is available.

Multiple testing has demonstrated that the device according to the present invention will produce a vacuum of from 7 to 9 inches of mercury using 10 pounds of air pressure, and up to 20 inches of mercury for 30 pounds of air pressure. The results are appreciably better than obtained heretofore insofar as vacuum is concerned with these low air pressures. Moreover, an enlarged mixing region is secured in the present invention, all the way around the periphery of bell 14, and a large volume of fine mixture is readily obtained at the output of the bell. An exceptional mixing action is produced, which is capable of providing a stable fog with heavy oils and the like, and is attributable to the high vacuum and the violent turbulence occurring at the downstream side of bell 14. The excellent mixing action and the volume of mixture produced is also believed attributable to the spreading out of the thin film of oil all around the rather large radius of bell 14 on the inner surface 16 thereof.

During the operation of the present invention, the oil in tube 12 need not be pressurized, but rather the valve (not shown) leading from an oil supply to the interior of the tube 12 need be opened only enough so that the correct amount of oil is delivered into the interior of tube 12 to produce the desired mixture. The vacuum produced by the venturi effect then draws the oil in the thin film to the outer extremity of lip 18 as hereinbefore described. For heavier oil, it is, however, sometimes desirable to provide an oil pump or the like for delivering the oil to the interior of tube 12. An oil pump may also be employed if a richer mixture is desired.

The foregoing description has been directed principally toward mixing of a liquid with a gas, but it should be understood that the device according to the present invention may also be employed to mix other fluid or flowable materials with a gas. For example, the mixing device according to the present invention may be employed as an extremely effective sand blasting means, with sand being supplied to the interior of tube 12, for instance.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A venturi device comprising:
   a tubular member for receiving and directing a first stream of fluid in a direction longitudinal thereof; and
   a conduit member centrally positioned in said tubular member,
   said conduit member being adapted to conduct a second stream of fluid into the interior of said tubular member in the direction of flow of said first stream of fluid,
   said conduit member and said tubular member forming an annulus therebetween,
   said annulus having constant inner and outer radii over the major portion of its length,
   said inner radius of said annulus increasing rapidly and substantially with respect to said outer radius in the region of the downstream terminus of said annulus to form a constriction therein,
   said constriction defining an annular venturi orifice through which said first stream of fluid accelerates and in which the pressure in said first stream of fluid decreases,
   said conduit member having a discharge opening adjacent said orifice for discharging said second stream of fluid into the interior of said tubular member,
   said conduit member being otherwise closed to said interior of said tubular member so that the entire flow of said first stream of fluid in said tubular member is discharged through said orifice,
   the maximum value of said inner radius of said annulus at said downstream terminus thereof being at least half the value of said outer radius at said terminus,
   said tubular member extending past said orifice to form a low pressure area downstream of said orifice and to redirect said second stream of fluid radially inwardly beyond said orifice for dispersion into said fluid of said first stream.

2. The device according to claim 1 wherein said tubular member has substantially the same inside diameter on both upstream and downstream sides of said conduit member, the periphery of said conduit member being circular at the downstream terminus of said annulus.

3. The device according to claim 1 wherein the conduit member includes a downstream opening bell, said bell having a circular peripheral lip adjacent and defining said annular venturi orifice between said lip and the inside diameter of said first named tubular member toward which fluid of said second stream is drawn as a film on an inner surface of said bell for dispersal thereof into said fluid of said first stream.

4. The device according to claim 3 wherein the diameter of said conduit member over the said major portion of the length of said annulus is not more than 80 percent of the diameter of said bell.

5. The device according to claim 1 wherein the diameter of the periphery of said conduit member is at least 60 percent of the inside diameter of said tubular member at said orifice.

6. The device according to claim 1 further including a plug centrally located in said discharge opening of said conduit member blocking said opening on the downstream side of said conduit member except for an annular opening adjacent said annular venturi orifice and through which fluid of the second stream is drawn.

7. The device according to claim 3 further including a plug received in the throat of said bell blocking the throat of said bell on the downstream side of said bell except for an annular passage adjacent said orifice through which fluid of the second stream is drawn,
   said plug having a tapered head spaced from the inner wall of said bell to provide a tapered annular passage therebetween.

8. The device according to claim 7 wherein the head of said plug is recessed within said bell on the upstream side of a plane defined by the circular peripheral lip of said bell.

9. The device according to claim 1 wherein said tubular member is substantially free of obstructions therewithin on the downstream side of said conduit member for a distance at least equal to the diameter of said conduit member.

10. The device according to claim 7 wherein said plug includes a shank portion extending into said conduit member and which is threadably received therein,
    said plug being provided with a plurality of peripheral slots for connecting said tapered annular passage to said conduit member beyond said plug.

11. The device according to claim 3 wherein said bell is uniformly tapered on the inside and outside thereof to said peripheral lip.

* * * * *